US011609337B2

(12) United States Patent
Collarte Bondy et al.

(10) Patent No.: US 11,609,337 B2
(45) Date of Patent: Mar. 21, 2023

(54) ESTIMATION OF SPATIAL PROFILE OF ENVIRONMENT

(71) Applicant: Baraja Pty Ltd., Lindfield West (AU)

(72) Inventors: Federico Collarte Bondy, Lindfield West (AU); Cibby Pulikkaseril, Lindfield West (AU)

(73) Assignee: Baraja Pty Ltd, Lindfield West (AU)

( * ) Notice: Subject to any disclaimer, the term of this patent is extended or adjusted under 35 U.S.C. 154(b) by 490 days.

(21) Appl. No.: 16/641,587

(22) PCT Filed: Aug. 24, 2018

(86) PCT No.: PCT/AU2018/050901
§ 371 (c)(1),
(2) Date: Feb. 24, 2020

(87) PCT Pub. No.: WO2019/036766
PCT Pub. Date: Feb. 28, 2019

(65) Prior Publication Data
US 2021/0157009 A1   May 27, 2021

(30) Foreign Application Priority Data
Aug. 25, 2017   (AU) ................................ 2017903440

(51) Int. Cl.
*G01S 17/931* (2020.01)
*G01S 7/00* (2006.01)
(Continued)

(52) U.S. Cl.
CPC ............ *G01S 17/931* (2020.01); *G01S 7/003* (2013.01); *G01S 17/42* (2013.01); *G01S 17/87* (2013.01);
(Continued)

(58) Field of Classification Search
CPC ........ G01S 17/931; G01S 7/003; G01S 17/42; G01S 17/87; G01S 17/89; H04B 10/1129
See application file for complete search history.

(56) References Cited

U.S. PATENT DOCUMENTS 3,271,486 A   9/1966   Dunlop
3,825,340 A * 7/1974   Debart .................... G01S 17/34
                                                  356/28

(Continued)

FOREIGN PATENT DOCUMENTS

DE   4427352 C1   1/1996
EP   0164181 A2   12/1985
(Continued)

OTHER PUBLICATIONS

Japanese First Office Action dated Jun. 22, 2022 in related Japanese Patent Application No. 2020-511278 (eight pages) (English machine translation).
(Continued)

*Primary Examiner* — Peter M Bythrow
(74) *Attorney, Agent, or Firm* — Kilpatrick Townsend & Stockton LLP

(57) ABSTRACT

Disclosed herein is a system and method for facilitating estimation of a spatial profile of an environment based on a light detection and ranging (LiDAR) based technique. By repurposing the optical energy for communications needs, the present disclosure facilitates spatial profile estimation by optical means while facilitating free-space optical communication.

20 Claims, 4 Drawing Sheets

(51) Int. Cl.
*G01S 17/42* (2006.01)
*G01S 17/87* (2020.01)
*G01S 17/89* (2020.01)
*H04B 10/112* (2013.01)

(52) U.S. Cl.
CPC .......... *G01S 17/89* (2013.01); *H04B 10/1129* (2013.01)

(56) References Cited

U.S. PATENT DOCUMENTS

| | | | |
|---|---|---|---|
| 3,953,667 A | 4/1976 | Layton et al. | |
| 4,628,501 A * | 12/1986 | Loscoe | H04J 14/0241 398/71 |
| 4,845,703 A * | 7/1989 | Suzuki | H04Q 11/0005 398/48 |
| 4,937,539 A * | 6/1990 | Grinberg | G02F 1/292 349/33 |
| 5,247,309 A * | 9/1993 | Reich | H01Q 3/2676 342/368 |
| 5,305,132 A * | 4/1994 | Fasen | H04B 10/1149 398/41 |
| 5,583,683 A | 12/1996 | Scobey | |
| 5,686,722 A | 11/1997 | Dubois et al. | |
| 5,835,203 A * | 11/1998 | Ogura | G01S 7/006 356/5.01 |
| 5,877,851 A | 3/1999 | Stann et al. | |
| 6,031,658 A | 2/2000 | Riza | |
| 6,147,760 A | 11/2000 | Geng | |
| 6,263,127 B1 | 7/2001 | Dragone et al. | |
| 6,278,538 B1 * | 8/2001 | Schleipen | H04N 1/129 348/E5.145 |
| 6,339,661 B1 | 1/2002 | Kokkelink et al. | |
| 6,377,720 B1 | 4/2002 | Kokkelink | |
| 6,687,036 B2 * | 2/2004 | Riza | G02B 26/106 359/615 |
| 7,489,865 B2 * | 2/2009 | Varshneya | H04B 10/1123 398/33 |
| 7,532,311 B2 | 5/2009 | Henderson et al. | |
| 7,804,056 B2 | 9/2010 | Bishop | |
| 7,831,298 B1 | 11/2010 | Wang et al. | |
| 7,969,558 B2 | 6/2011 | Hall | |
| 7,986,397 B1 | 7/2011 | Tiemann et al. | |
| 8,159,680 B2 | 4/2012 | Robinson et al. | |
| 8,440,952 B2 | 5/2013 | Jalali et al. | |
| 8,599,381 B2 | 12/2013 | Statz et al. | |
| 8,701,482 B2 | 4/2014 | Tsadka et al. | |
| 9,246,589 B2 * | 1/2016 | Koonen | H04B 10/2575 |
| 9,432,115 B2 * | 8/2016 | Roberts | H04B 10/116 |
| 9,684,076 B1 * | 6/2017 | Feldkhun | G01S 17/89 |
| 9,723,386 B1 * | 8/2017 | Ni | H04B 10/1129 |
| 10,527,727 B2 | 1/2020 | Bondy et al. | |
| 11,162,789 B2 | 11/2021 | Lodin et al. | |
| 2002/0126945 A1 | 9/2002 | Konishi et al. | |
| 2003/0179804 A1 | 9/2003 | Cook et al. | |
| 2004/0086214 A1 | 5/2004 | Huang et al. | |
| 2005/0024640 A1 | 2/2005 | Fataley et al. | |
| 2007/0103699 A1 | 5/2007 | Kohnen et al. | |
| 2007/0177841 A1 | 8/2007 | Danziger | |
| 2007/0181810 A1 | 8/2007 | Tan et al. | |
| 2008/0208472 A1 * | 8/2008 | Morcom | G01S 17/86 701/301 |
| 2009/0002680 A1 | 1/2009 | Ruff et al. | |
| 2011/0106324 A1 | 5/2011 | Tsadka et al. | |
| 2011/0199621 A1 * | 8/2011 | Robinson | G01S 17/89 356/628 |
| 2011/0286749 A1 * | 11/2011 | Schoon | H04B 10/1129 398/128 |
| 2013/0044309 A1 | 2/2013 | Dakin et al. | |
| 2013/0242400 A1 * | 9/2013 | Chen | G02B 27/0087 359/618 |
| 2013/0315604 A1 * | 11/2013 | LoPresti | H04B 10/271 398/116 |
| 2014/0078298 A1 | 3/2014 | Kudenov et al. | |
| 2014/0248058 A1 * | 9/2014 | Simpson | H04B 13/02 398/104 |
| 2015/0025709 A1 * | 1/2015 | Spaulding | G08G 1/163 398/118 |
| 2015/0043009 A1 | 2/2015 | Bridges et al. | |
| 2015/0086198 A1 | 3/2015 | Frisken et al. | |
| 2015/0192677 A1 | 7/2015 | Yu et al. | |
| 2016/0041266 A1 * | 2/2016 | Smits | G01S 17/66 356/5.01 |
| 2016/0047890 A1 * | 2/2016 | Ryan | H04W 4/40 398/118 |
| 2016/0282449 A1 * | 9/2016 | Slobodyanyuk | G01S 7/0235 |
| 2016/0291156 A1 * | 10/2016 | Hjelmstad | G01S 17/42 |
| 2016/0294472 A1 * | 10/2016 | Palmer | H04B 7/0617 |
| 2016/0327648 A1 | 11/2016 | Lipson et al. | |
| 2017/0023661 A1 * | 1/2017 | Richert | G01S 15/08 |
| 2017/0025753 A1 | 1/2017 | Driscoll et al. | |
| 2017/0090031 A1 | 3/2017 | Bondy et al. | |
| 2017/0153319 A1 | 6/2017 | Villeneuve et al. | |
| 2018/0031680 A1 * | 2/2018 | Lee | G01S 7/4817 |
| 2019/0310377 A1 | 10/2019 | Lodin et al. | |
| 2020/0081128 A1 | 3/2020 | Bondy et al. | |
| 2020/0363633 A1 | 11/2020 | Pulikkaseril et al. | |
| 2021/0247497 A1 | 8/2021 | Li et al. | |

FOREIGN PATENT DOCUMENTS

| | | |
|---|---|---|
| EP | 0811855 A2 | 12/1997 |
| EP | 1065551 A2 | 1/2001 |
| EP | 2212717 B1 | 3/2015 |
| EP | 2866051 A1 | 4/2015 |
| EP | 3081956 A1 | 10/2016 |
| JP | H08-285942 A | 11/1996 |
| JP | 2008-506927 A | 3/2008 |
| JP | 2009-222616 A | 10/2009 |
| JP | 2010-048662 A | 3/2010 |
| JP | 2011-085610 A | 4/2011 |
| JP | 2014-505861 A | 3/2014 |
| WO | 03/009032 A1 | 1/2003 |
| WO | 2011/036553 A1 | 3/2011 |
| WO | 2014/136110 A1 | 9/2014 |
| WO | 2015/018836 A1 | 2/2015 |
| WO | 2015/059244 A1 | 4/2015 |
| WO | 2016/097409 A2 | 6/2016 |
| WO | 2017/054036 A1 | 4/2017 |
| WO | 2017/176901 A1 | 10/2017 |
| WO | 2018/090085 A1 | 5/2018 |
| WO | 2018/107237 A1 | 6/2018 |
| WO | 2019/036766 A1 | 2/2019 |
| WO | 2019/046895 A1 | 3/2019 |
| WO | 2019/232585 A1 | 12/2019 |

OTHER PUBLICATIONS

Supplementary European Search Report dated Mar. 29, 2021 in related European Patent Application 18849158.3 (eight pages).
International-type search for provisional patent application dated May 24, 2018, in Australian Patent Application No. 2017903440, filed Aug. 25, 2017, 11 pages.
International Search Report of the International Searching Authority dated Nov. 2, 2018, in International Patent Application No. PCT/AU2018/050901, filed Aug. 24, 2018, 5 pages.
Written Opinion of the International Searching Authority dated Nov. 2, 2018, in International Patent Application No. PCT/AU2018/050901, filed Aug. 24, 2018, 6 pages.
International-type search for provisional patent application dated Jun. 16, 2017, in Australian Patent Application No. 2016905228, filed Dec. 16, 2016, 9 pages.
International Search Report of the International Searching Authority dated Feb. 27, 2018, in International Patent Application No. PCT/AU2017/051395, filed Dec. 15, 2017, 8 pages.
Written Opinion of the the International Searching Authority dated Feb. 27, 2018, in International Patent Application No. PCT/AU2017/051395, filed Dec. 15, 2017, 4 pages.
Wanatabe et al., "Low-loss wavelength routing optical switch consisting of small matrix switch and cyclic arrayed-waveguide

(56) References Cited

OTHER PUBLICATIONS gratings for colorless add/drop," *Jpn. J. of App. Phys.*, 53 08MB02, 2014.
Pierrottet et al., "Linear FMCW Laser Radar for Precision Range and Vector Velocity Measurements," 2008.
Dieckmann, A., "FMCW-LIDAR with tunable twin-guide laser diode," *Electronics Letters*, 30:4, 1994.
Quack et al., "Development of an FMCW LADAR Source Chip using MEMS-Electronic—Photonic Heterogeneous Integration," GOMACTech, Charleston, South Carolina, USA, Mar. 31-Apr. 3, 2014.
Gao et al., "Complex-optical-field lidar system for range and vector velocity measurement," Optics Express, 20:23, pp. 25867-25875, 2012.
International Search Report of the International Searching Authority dated Nov. 25, 2016, in International Patent Application No. PCT/AU2016/050899, filed Sep. 23, 2016. (eight pages.).
International Preliminary Report on Patenability dated Apr. 3, 2018 in International Patent Application No. PCT/AU2016/050899, filed Sep. 23, 2016. (five pages).
International Search Report of the International Searching Authority dated Oct. 25, 2018, in International Patent Application No. PCT/AU2018/050961, filed Sep. 6, 2018. (eleven pages.).
International-Type Search Report of the Australian Patent Office dated May 23, 2018, in International Patent Application No. PCT/AU2017/903597, filed Sep. 6, 2017, (ten pages).
International Search Report of the International Searching Authority dated Jul. 17, 2019, in International Patent Application No. PCT/AU2019/050437, filed May 10, 2019, (eight pages).
Supplementary European Search Report dated Jul. 13, 2020 in corresponding European Patent Application No. 17880429.0 (eight pages).
Notice of Reasons of First Refusal in related Japanese Patent Application No. 2019-530217, dated Aug. 25, 2021 with English machine translation (nine pages).
Notice of Allowance dated Jul. 16, 2021 in related U.S. Appl. No. 16/467,319, filed Jun. 6, 2019 (18 pages).
Notice of Allowance dated Nov. 30, 2021 in related U.S. Appl. No. 17/412,149, filed Aug. 25, 2021 (15 pages).
Doylend et al. "Hybrid III/V silicon photonic source with integrated 1D free-space beam steering" Oct. 15, 2012, vol. 37, No. 20, Optics Letters 4257, 3 pages.
Sun et al. "Large-Scale Integrated Silicon Photonic Circuits for Optical Phased Arrays" Advanced Photonics for Communications © 2014 OSA, 3 pages.
Watanabe et al. "Low-loss wavelength routing optical switch consisting of small matrix switch and cyclic arrayed-waveguide gratings for colorless add/drop" Japanese Journal of Applied Physics 53, 08MB02 (2014), 5 pages.
Wei et al., "Design optimization of flattop interleaver and its dispersion compensation", Optics Express vol. 15, May 14, 2007, p. 6439-6457, 19 pages.
Hulme et al. "Fully integrated hybrid silicon two dimensional beam scanner" Mar. 9, 2015, vol. 23, No. 5, Optics Express 5861, 18 pages.
Komljenovic et al. "Sparse aperiodic arrays for optical beam forming and LIDAR" vol. 25, No. 3, Feb. 6, 2017, Optics Express 2511, 14 pages.

\* cited by examiner

ESTIMATION OF SPATIAL PROFILE OF ENVIRONMENT

FIELD

The present invention generally relates to a system and method for facilitating estimation of a spatial profile of an environment. More particularly, the present invention relates to facilitating estimation of a spatial profile of an environment by optical means while facilitating free-space optical communication.

BACKGROUND

Spatial profiling refers to the mapping of an environment as viewed from a desired field of view. Each point or pixel in the field of view is associated with a distance to form a representation of the environment. Spatial profiles may be useful in identifying objects and/or obstacles in the environment, thereby facilitating automation of tasks.

One technique of spatial profiling involves sending light into an environment in a specific direction and detecting any light reflected back from that direction, for example, by a reflecting surface in the environment. The reflected light carries relevant information for determining the distance to the reflecting surface. The combination of the specific direction and the distance forms a point or pixel in the representation of the environment. The above steps may be repeated for multiple different directions to form other points or pixels of the representation, thereby facilitating estimation of the spatial profile of the environment within a desired field of view.

Reference to any prior art in the specification is not, and should not be taken as, an acknowledgment or any form of suggestion that this prior art forms part of the common general knowledge in any jurisdiction or that this prior art could reasonably be expected to be understood, regarded as relevant and/or combined with other pieces of prior art by a person skilled in the art.

SUMMARY

According to a first aspect of the present disclosure, there is provided a system for facilitating estimation of a spatial profile of an environment, the system including:

a light source configured to provide outgoing light;

a beam director configured to direct the outgoing light into the environment along one or more directions, the directed light imparted with outgoing communication information to be received by a first communications receiver reachable in at least one of the one or more directions; and a light detector configured to detect incoming light, the incoming light corresponding to at least part of the outgoing light reflected by the environment, wherein at least one characteristic associated with the detected light includes distance information for estimation of the spatial profile of the environment associated with the one or more outgoing directions.

In some embodiments, the outgoing light is provided at one or more selected wavelength channels, and the one or more directions correspond to the respective one or more selected wavelength channels.

In some embodiments the outgoing light includes a maximum-length-based sequence (MLS) to encode the outgoing light. The light source may include an encoder to encode the communications information at an in-band frequency on the MLS. Alternatively, the light source may include an encoder to encode the communications information at an out-of-band frequency on the MLS.

In some embodiments the outgoing light includes a Barker code.

In some embodiments the outgoing light is provided at one or more selected wavelength channels, and the one or more directions correspond to the respective one or more selected wavelength channels.

In some embodiments the system further includes a processer to determine the at least one of the one or more directions based on the estimated spatial profile. The processor may be configured to determine one or more selected directions based on a recognisable object profile in the estimated spatial profile to facilitate directed communication.

In some embodiments the beam director comprises a dispersive element free-space coupled to expansion optics.

In some embodiments the at least one of the one or more directions includes all of the one or more directions to facilitate a broadcast communication.

In some embodiments the first communications receiver is coupled to a communications transmitter, and the light detector includes a second communication receiver to receive, from the communications transmitter, light imparted with incoming communication information.

In some embodiments the system is located in a road vehicle, and wherein the first communications receiver and/or the communications transmitter is/are located in a roadside unit.

In some embodiments the system is located in a first road vehicle, and wherein the first communications receiver and/or the communications transmitter is/are located in a second road vehicle.

In some embodiments the system is located in a railway vehicle, and wherein the first communications receiver and/or the communications transmitter is/are located in a railside unit.

In some embodiments the system is located in a first railway vehicle, and wherein the first communications receiver and/or the communications transmitter is/are located in a second railway vehicle.

According to a second aspect of the present disclosure, there is provided a method for facilitating estimation of a spatial profile of an environment, the method including the steps of:

providing outgoing light;

directing the outgoing light into the environment along one or more directions, the directed light imparted with outgoing communication information to be received by a first communications receiver reachable in at least one of the one or more directions; and detecting incoming light, the incoming light corresponding to at least part of the outgoing light reflected by the environment, wherein at least one characteristic associated with the detected light includes distance information for estimation of the spatial profile of the environment associated with the one or more outgoing directions.

In some embodiments the outgoing light is provided at one or more selected wavelength channels, and the one or more directions correspond to the respective one or more selected wavelength channels.

In some embodiments, the method further includes: determining one or more selected directions for light imparted with further outgoing communication information to be directed to the first communications receiver; and directing further outgoing light into the environment along the one or more selected directions, the further directed light imparted with the further outgoing communication information to be received by the first communications receiver.

In some embodiments, there are at least two units each performing an embodiment of the method described in the preceding paragraphs, wherein the method further includes communicating, from one unit to another unit, information based on the detecting by that unit and utilising the communicated information to effectively extend a spatial profiling range of the other unit.

According to a third aspect of the present disclosure, there is provided a communications receiver for receiving light directed from a system for facilitating estimation of a spatial profile of an environment in which the communications receiver is located, the directed light being imparted with communication information.

In some embodiments the communications receiver further includes a recognisable object profile, recognisable by the system.

In some embodiments the communications receiver has a field of view greater than a threshold field of view.

In some embodiments the communications receiver has an adjustable field of view.

According to a fourth aspect of the present disclosure, there is provided a communications network comprising a plurality of transmitters and a plurality of receivers, wherein the plurality of transmitters each comprise a light source configured to provide outgoing light and a beam director configured to direct the outgoing light into the environment along one or more directions, the directed light imparted with outgoing communication information, and wherein the plurality of receivers to receive the directed from at least one said transmitter, wherein the network comprises at least two stationary units at different physical locations comprising a first said transmitter and a first said receiver in communication with the first transmitter and at least one mobile unit comprising a second said receiver and a second said transmitter, the at least one mobile unit providing an ad-hoc communication node within the communications network.

In some embodiments at least one of the at least two stationary units and at least one mobile unit is configured to gather spatial profiling information of an environment about the unit and communicate the spatial profiling information to another of the units.

Each of the units may have the characteristics of any embodiment of the system for facilitating estimation of a spatial profile of an environment disclosed herein.

Further aspects of the present disclosure and further embodiments of the aspects described in the preceding paragraphs will become apparent from the following description, given by way of example and with reference to the accompanying drawings.

DETAILED DESCRIPTION

Disclosed herein is a system and method for facilitating estimation of a spatial profile of an environment based on a light detection and ranging (LiDAR) based technique. "Light" hereinafter includes electromagnetic radiation having optical frequencies, including far-infrared radiation, infrared radiation, visible radiation and ultraviolet radiation. In general, LiDAR involves transmitting light into the environment and subsequently detecting reflected light returned by the environment. By determining the time it takes for the light to make a round trip to and from, and hence the distance of, reflecting surfaces within a field of view, an estimation of the spatial profile of the environment may be formed. In one arrangement, the present disclosure facilitates spatial profile estimation based on directing light over one dimension, such as along the vertical direction. In another arrangement, by further directing the one-dimensionally directed light in another dimension, such as along the horizontal direction, the present disclosure facilitates spatial profile estimation based on directing light in two dimensions.

Figure 4:
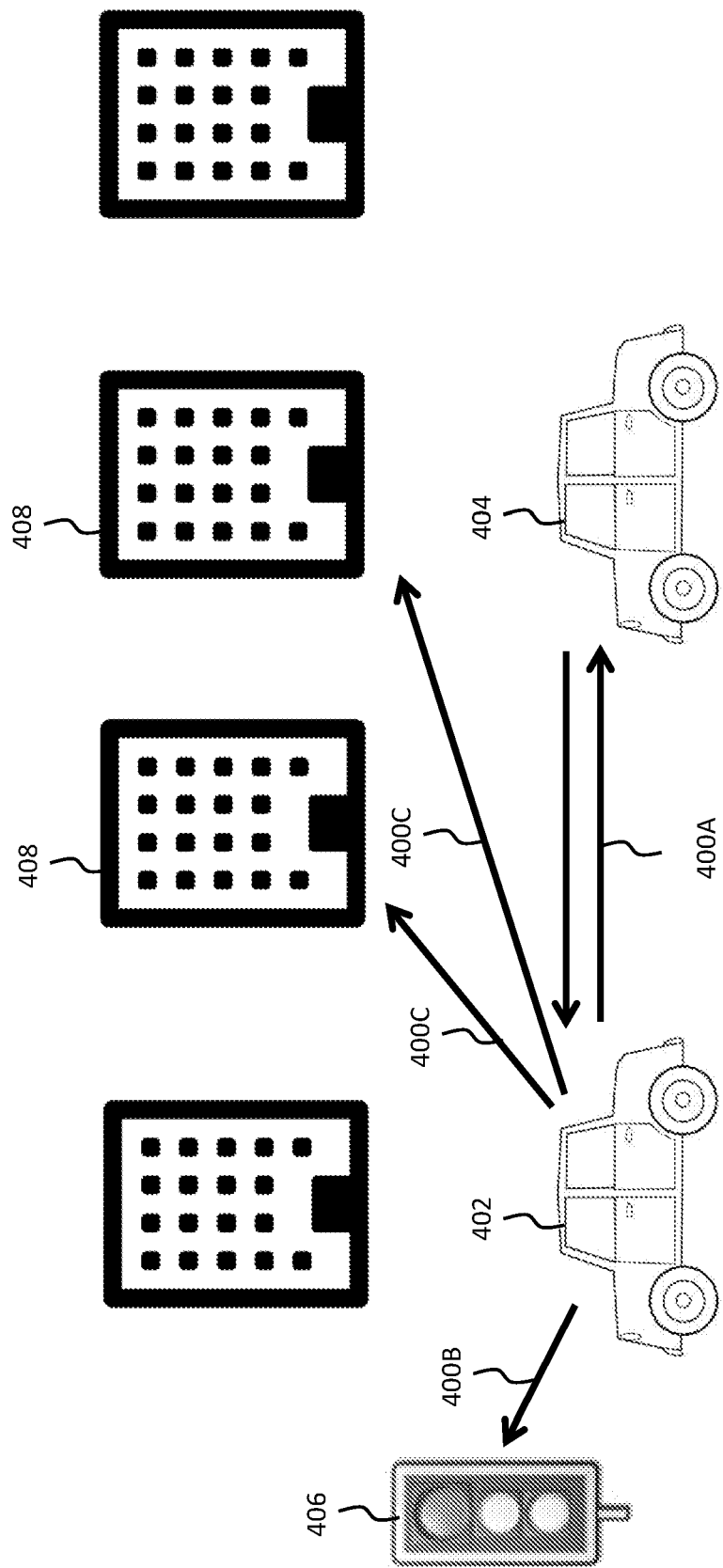
FIG. 4 illustrates a use-case scenario of the present disclosure.

The discloser(s) of the present disclosure recognise(s) that, where part of the environment to be spatially profiled includes an optical receiver, the transmitted light may additionally be used to carry information for communication purposes. As illustrated in FIG. 4, in the context of transportation, where the transmitted light 400A, B and C originates from a mobile unit (e.g. a road vehicle 402 or railway vehicle (not shown)), the optical receiver may be located on another mobile unit (e.g. another road vehicle 404 or railway vehicle (not shown)) or a stationary unit (e.g. a road-side unit, such as traffic light 406, a building 408 or a railway signalling unit (not shown)). Communication with another mobile unit may be to improve transport safety (e.g. to avoid collision with each other) on an ad-hoc and point-to-point basis. This kind of communication requires low-latency communication, responsive to the potentially rapidly changing relative movements of the mobile units. On the other hand, communication with a stationary unit may be to provide locality-based information (e.g. to alert surrounding units of hazards ahead or to retrieve traffic data), or to allow downloading or uploading of information to a wider network (e.g. the Internet).

The multiple units (e.g. 402, 404, 406 and 408) may be connected to form, extend or reroute a communications network. For example, stationary units may be deployed on roof tops of buildings (such as 408) to form communication nodes, whereas the mobile units (such as 402 and 404) may act as ad-hoc communication nodes to add bandwidth or capacity to the communication network. Compared to non-free-space optical communication (i.e. fibre-optic communication), free-space optical communication has a lower latency due to the higher speed of light in free-space (or air) than in optical fibres. As another example, the spatial profiling range of one unit (e.g. 404) may be extended by receiving additional spatial profiling information (e.g. carried by light 400A), via the disclosed free-space communication technique, from another unit (e.g. 404), and vice versa. Two units therefore can share spatial profiling information and extend their individual range.

Figure 1:
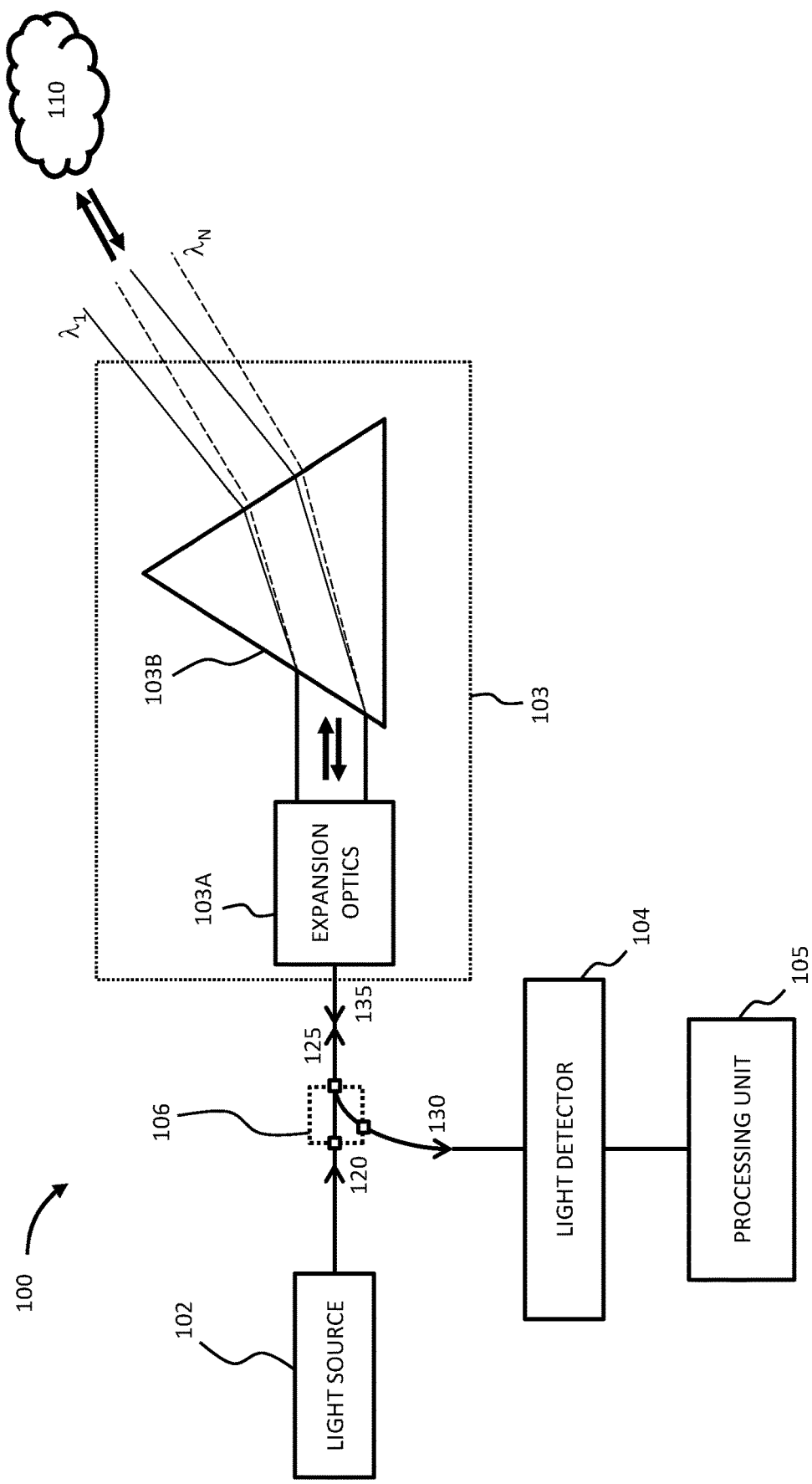
FIG. 1 illustrates an arrangement of a system for facilitating estimation of a spatial profile of an environment.

In a general form, as illustrated in FIG. 1, the disclosed system 100 includes a light source 102 configured to provide outgoing light, a beam director 103 configured to direct the outgoing light 120 into the environment 110 along one or more directions, and a light detector 104 configured to detect incoming light 130, the incoming light corresponding to at least part of the outgoing light 120 reflected by the environment 110. At least one characteristic associated with the detected light includes distance information for estimation of the spatial profile of the environment 110 associated with the one or more outgoing directions. The beam director 103 may include expansion optics 103A which is fibre-optically coupled to the light source 102 and light detector 104. The beam director 103 may additionally include a dispersive element 103B which is free-space coupled to the expansion optics 103A. The disclosed system 100 may include a circulating element 106 so that at least parts of the outgoing path 125 and incoming path 135 are shared.

A skilled person in the art would appreciate that the appropriate characteristics to rely upon depend on the form of the outgoing light. Where the outgoing light is in the form of a pulse, an appropriate characteristic may include the round-trip time of the peak or centre of the pulse. Where the outgoing light is in the form of a modulated waveform, an appropriate characteristic may include the phase shift or phase delay of the incoming light. Where the outgoing light is in the form of an encoded pulse or modulation, an appropriate characteristic may include the cross-correlation of the incoming light with the code.

Figure 2:
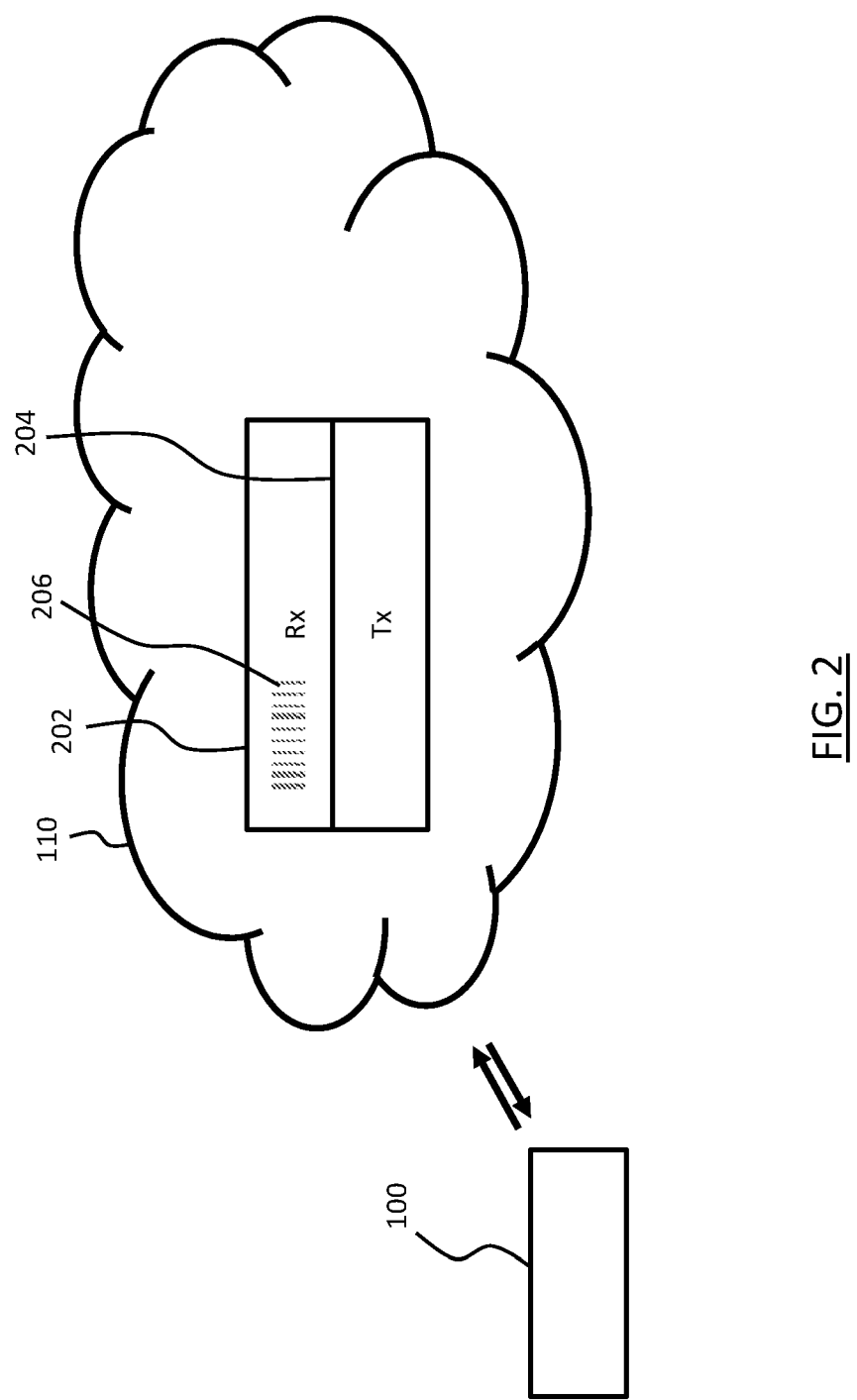
FIG. 2 illustrates the system of FIG. 1 in an environment including a communications receiver and a communications transmitter.
Figure 3:
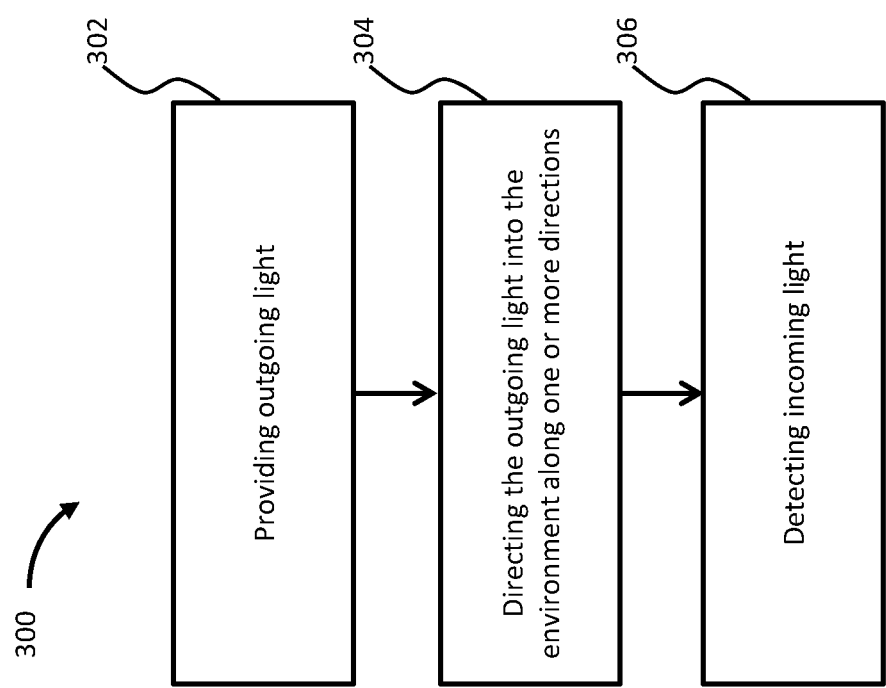
FIG. 3 illustrates an outline of a method for facilitating estimation of a spatial profile of an environment.

The directed light is imparted with outgoing communications information. For example, communication information may be imparted on to light by a modulator, such as an intensity modulator or a phase modulator. As illustrated in FIG. 2, the outgoing communications information from the disclosed system 100 is to be received by a communications receiver 202 reachable in at least one of the one or more directions. In the context of transportation, where the outgoing communications information originates from a mobile unit (e.g. a road or railway vehicle), the communications receiver may be located on another mobile unit (e.g. another road or railway vehicle) or a stationary unit (e.g. a road-side unit or a railway signalling unit). Communication with another mobile unit may be to improve transport safety (e.g. to avoid collision with each other), whereas communication with a stationary unit may be to provide locality-based information (e.g. to alert surrounding units of hazards ahead or to retrieve traffic data). In some arrangements, the disclosed system 100 includes a processor 105 for processing information, such as the distance information and/or the communications information. A skilled person would appreciate that references to "a processor" are intended to include information processing by more than a single unit of processor or by distributed processing.

In some arrangements, the communications receiver 202 is operatively coupled to a communications transmitter 204 for transmitting responsive communications information, in response to receipt of the outgoing communications information received by the communications receiver 202. The communications receiver 202 and communications transmitter 204 together may be a communications transceiver as a single unit. Alternatively the communications receiver 202 and communications transmitter 204 are separate.

In one arrangement, the outgoing light includes a maximum- length-based sequence (MLS) to encode the outgoing light. For example, the MLS includes a family of Barker code. The processor may be configured to authenticate the encoded incoming light carrying the distance information based on the MLS. For example, the processor may cross-correlate the incoming light with a local copy of the MLS used in the outgoing light to determine whether the incoming light is authenticated. If the correlation is high (e.g. resulting in a correlation signal at or above a threshold signal level), the incoming light is authenticated. Otherwise or if the correlation is low (e.g. resulting in a correlation signal below a threshold signal level), the incoming light may be caused by spoofing and is not authenticated. In one arrangement, the bandwidth of the MLS is between approximately 10 MHz and approximately 1 GHz. In another arrangement, the bandwidth of the MLS is between approximately 50 MHz and approximately 200 MHz. In yet another arrangement, the bandwidth of the MLS is approximately 100 MHz. In one arrangement, the light source 102 includes an encoder (e.g. an intensity modulator and/or a phase modulator) to encode the communications information at one or more in-band frequencies on the MLS. In this arrangement, the MLS itself represents encoded information to be communicated to the communications receiver 202. The bandwidth of the encoded information is therefore similar to that of the MLS (e.g. between approximately 10 MHz and approximately 1 GHz). In one example, the MLS may be represented by a binary sequence (i.e. two levels), such as low and high intensity levels. In another example, the MLS may be represented by more than two levels. In the binary example, the MLS may be a "MLS9" sequence, being seeded by 9 bits of information to generate a 511-bit long sequence ($2^9-1=511$) for encoded transmission. The receiver 202 may be configured to decode the MLS9 sequence to recover an estimate of the 9 bits of information. In this arrangement, the transmitted information is encrypted. This arrangement is resistant to noise but requires overhead and more signal processing. To improve use of communication bandwidth, once the system 100 determines the direction in which the communications receiver 202 can be reached (e.g. in the first scan of the environment), the system 100 may be configured to omit subsequent scans of the environment, and may be configured to direct light carrying the communication information to the communications receiver 202 until all information has been transmitted.

In an alternative arrangement, the light source 102 includes an encoder (e.g. an intensity modulator and/or a phase modulator) to encode the communications information at one or more out-of-band frequencies on the MLS. In this arrangement, information to be communicated to the communications receiver 202 is encoded on to the MLS. The bandwidth of the encoded information is therefore higher than that of the MLS (e.g. beyond approximately 1 or a few GHz). For example, the encoder may encode the communication as a small amplitude or intensity fluctuation (e.g. 1%) of the amplitude or intensity of the MLS. The bandwidth of the fluctuation can be independent of the MLS bandwidth. The bit rate of this alternative arrangement can therefore be at or above approximately 1 Gb/s. To decode the communications information, the communications receiver 202 may include a high-pass filter to suppress the underlying frequencies of the MLS (e.g. below 1 GHz) to emphasise the out-of-band frequencies carrying the communications information. Still alternatively, the light source 102 includes an encoder (e.g. an intensity modulator and/or a phase modulator) to encode the communications information at both in-band and out-of-band frequencies on the MLS. A skilled person would appreciate that other types of sequences, such as pseudo-random binary sequence, may be used instead of MLS. Further, the encoder may encode the communications in a non-binary and/or non-digital manner, such as using sinusoidal modulation.

In one arrangement, as illustrated in FIG. 1, the outgoing light is provided at one or more selected wavelength channels $\lambda_1 \ldots \lambda_N$, and the one or more directions correspond to the respective one or more selected wavelength channels $\lambda_1 \ldots \lambda_N$. Wavelength-dependent directivity assists to suppress communications information from being transmitted and/or received from unintended directions. In this arrangement, the system 100 provides an inherent directional filter. For example, a vehicle having the system 100 and stopping at a set of traffic lights with a corresponding communications receiver 202 communicates with the corresponding communications receiver 202 at a specific direction(s) and hence a specific wavelength channel(s). In this example, either or both of the vehicle and the set of traffic lights may lock on to the specific wavelength channel(s) for communications purposes, thereby potentially reducing noise or malicious attacks, or the chance of the communications information being intercepted.

In one arrangement, the communications information may be broadcast in all directions in which outgoing light is directed. Alternatively, the communications information may be imparted on light to be directed in only one (i.e. unicast) or some (i.e. multicast) of the directions. In this alternative arrangement, the communication information may be imparted on one or more selected directions based on a recognisable object profile in the estimated spatial profile to facilitate directing the directed light. An object profile may include a shape, contour, and/or reflected optical intensity of the object. For example, in case of continuous scanning for spatial profile estimation, a first scan of the environment 110 enables the processor 105 to determine presence of any communications receiver based on recognition of its shape, contour, and/or reflected intensity. Based on the direction(s) of any present communications receiver as determined by the first scan, with or without any velocity information (magnitude and direction) of the disclosed system 100, the processor 105 may determine the direction(s) in which the outgoing light in second and subsequent scans are likely received by the present communications receiver. This selectivity reduces unnecessary power usage and, alternatively or additionally, reduces the chance of the communications information being intercepted.

In one arrangement, the light detector 104 includes a communications receiver (not shown) to receive, from the communications transmitter 204, light imparted with incoming communication information. This arrangement allows two-way communication between the disclosed system 100 (e.g. located on a mobile unit such as a road vehicle or railway vehicle) and a corresponding system (e.g. located on another mobile unit or a stationary unit such as a road-side unit or a railway signalling unit) in the environment 110. A skilled person would appreciate that the description herein on the system 100 is equally applicable to the corresponding system. For example, like the system 100, the corresponding system is configured to facilitate estimation of a spatial profile of an environment. Such estimation allows the corresponding system to, responsive to receipt of communication information from the system 100, determine the direction in which light carrying responsive communication information may be directed to reach the system 100.

In another aspect, there is provided a method 300 for facilitating estimation of a spatial profile of an environment. The method 300 includes the step 302 of providing outgoing light, the step of 304 of directing the outgoing light into the environment along one or more directions, the directed light imparted with outgoing communication information to be received by a first communications receiver reachable in at least one of the one or more directions, and the step 306 of detecting incoming light, the incoming light corresponding to at least part of the outgoing light reflected by the environment, wherein at least one characteristic associated with the detected light includes distance information for estimation of the spatial profile of the environment associated with the one or more outgoing directions.

The method 300 may further include the steps of determining one or more selected directions for light imparted with further outgoing communication information to be directed to the first communications receiver, and directing further outgoing light into the environment along the one or more selected directions, the further directed light imparted with the further outgoing communication information to be received by the first communications receiver.

In another aspect of the present disclosure, there is provided a communications receiver 202 for receiving light directed from a system 100 for facilitating estimation of a spatial profile of an environment in which the communications receiver is located, the directed light being imparted with communication information. The communications receiver 202 may include a recognisable object profile, recognisable by the system 100. The recognition may assist in directing the directed light from the system 100 to the communications receiver 202. An object profile may include a shape, contour, and/or reflected optical intensity of the object. The reflected optical intensity of an object may include a variation in the reflected optical intensity across the objection. For example, the variation in reflected optical intensity may be achieved the object including regions 206 of contrasting reflectivity, such as in the form of a barcode or QR code. In this example, the system 100 upon estimating the spatial profile of the environment 110 is configured to recognise a recognisable reflected optical intensity achieved by the regions 206 of contrasting reflectivity.

In one arrangement, the communications receiver 202 may have a field of view (FOV) greater than a threshold FOV. While a wide FOV relates to poor efficiency, the wide FOV facilitates collection, at a wide angle or solid angle, of the transmitted light carrying communications information. The threshold FOV may be dependent on one or more of the following factors:

1. The threshold FOV may be dependent on the FOV of the system 100. For example, the FOV of the communications receiver 202 is larger than the FOV of the system 100. In another example, the FOV of the communications receiver 202 is a set multiple (e.g. 2, 3, 4, 5, 6, 7, 8, 9 or 10 times) or near a set multiple larger than the FOV of the system 100.
2. The threshold FOV may depend on the required angle of light collection. For example, a set of traffic lights may be angled at a particular direction, and hence a particular solid angle, from vehicles stopping at the set of traffic lights. To capture communications information from, e.g., the first 10 vehicles stopped at the set of traffic lights, the threshold FOV is determined based on allowing collection of the transmitted light carrying the communications information from at least as far as 10 average vehicle lengths away (ignoring vehicle-to-vehicle separation).
3. The threshold FOV may depend on the minimum required received optical power of the communications receiver 202. For example, if the minimum required received optical power is $P^{min}_{Rx}=-20$ dBm, and if the transmitted optical power leaving the system 100 is $P_{Tx}=+30$ dBm, the FOV may be increased to withstand as much as 50 dB loss ($P_{Tx}-P^{min}_{Rx}$), with the threshold FOV corresponding to a FOV contributing to 50 dB loss ($P_{Tx}-P^{min}_{Rx}$).

In one arrangement, the communications receiver 202 includes an optical diffuser to facilitate collection of the transmitted light. The optical diffuser acts to widen the FOV of the communications receiver 202.

In one arrangement, the FOV of the communications receiver 202 is adjustable. For example, the communications receiver 202 may include a telescopic lens system to adjust its FOV. The adjustment may be a magnification of from the original FOV to a magnified FOV. In another example, the communications receiver 202 may swappable lenses to adjust its FOV. The FOV may be adjusted based on the threshold FOV, which may change over time.

Now that arrangements of the present disclosure are described, it should be apparent to the skilled person in the art that at least one of the described arrangements have the following advantages:

The optical energies used for distance or ranging needs can be simultaneously repurposed for communication needs.

Wavelength-dependent directivity provides a directional filter, potentially reduces noise or malicious attacks, or the chance of the communications information being intercepted.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A system for facilitating estimation of a spatial profile of an environment, the system including:
    a first unit of a spatial profile estimator for estimating a spatial profile of a first portion of the environment; and
    a second unit of the spatial profile estimator for estimating a spatial profile of a second portion of the environment, wherein the second unit includes:
        a light source configured to provide outgoing light;
        a beam director configured to direct the outgoing light into the environment along one or more directions, the directed outgoing light imparted with outgoing communication information to be received by the first unit reachable in at least one of the one or more directions; and
        a light detector configured to detect incoming light, the incoming light corresponding to at least part of the outgoing light reflected by the environment, wherein at least one characteristic associated with the detected light includes distance information for estimation of the spatial profile of the second portion of the environment associated with the one or more directions,
    wherein the outgoing communication information includes spatial profiling information for reception by the first unit to effectively extend a spatial profiling range of the first unit.

2. The system of claim 1 wherein the outgoing light includes a maximum-length-based sequence (MLS) to encode the outgoing light.

3. The system of claim 2 wherein the light source includes an encoder to encode the outgoing communication information at an in-band frequency on the MLS.

4. The system of claim 2 wherein the light source includes an encoder to encode the outgoing communication information at an out-of-band frequency on the MLS.

5. The system of claim 1 wherein the outgoing light includes a Barker code.

6. The system of claim 1 wherein the beam director comprises a dispersive element free-space coupled to expansion optics.

7. The system of claim 1 further including a processor to determine the at least one of the one or more directions based on the estimated spatial profile.

8. The system of claim 7 wherein the processor is configured to determine one or more selected directions based on a recognisable object profile in the estimated spatial profile to facilitate directed communication.

9. The system of claim 1 wherein the at least one of the one or more directions includes all of the one or more directions to facilitate a broadcast communication.

10. The system claim 1 wherein the first unit is coupled to a communications transmitter, and the light detector includes a second communications receiver to receive, from the communications transmitter, light imparted with incoming communication information.

11. The system claim 1 wherein the system is located in a road vehicle, and wherein the first unit is located in a road-side unit.

12. The system claim 1 wherein the system is located in a first road vehicle, and wherein the first unit is located in a second road vehicle.

13. The system claim 1 wherein the system is located in a railway vehicle, and wherein the first unit is located in a rail-side unit.

14. The system of claim 1 wherein the system is located in a first railway vehicle, and wherein the first unit is located in a second railway vehicle.

15. A method for facilitating estimation of a spatial profile of an environment, the method including the steps of:
    providing, by a light source, outgoing light;
    directing, by a beam director, the outgoing light into the environment along one or more directions, the directed outgoing light imparted with outgoing communication information to be received by a first communications receiver reachable in at least one of the one or more directions; and
    detecting, by a light receiver, incoming light, the incoming light corresponding to at least part of the outgoing light reflected by the environment, wherein at least one characteristic associated with the detected incoming light includes distance information for estimation of the spatial profile of the environment associated with the one or more directions, wherein the outgoing communication information includes spatial profiling information, and wherein providing outgoing light, directing the outgoing light and detecting incoming light are performed by a first unit, the method further comprising:
        providing outgoing light, directing the outgoing light, and detecting incoming light at a second unit located in the environment of the first unit;
        communicating, from the second unit to the first unit, information based on the detecting by the second unit; and
        utilizing the outgoing communicated information to effectively extend a spatial profiling range of the first unit.

16. The method of claim 15 further including the steps of:
    determining one or more selected directions for light imparted with further outgoing communication information to be directed to the first communications receiver; and
    directing further outgoing light into the environment along the one or more selected directions, the further directed light imparted with the further outgoing communication information to be received by the first communications receiver.

17. The method of claim 15, wherein the beam director comprises a dispersive element free-space coupled to expansion optics.

18. The method of claim 15, wherein providing outgoing light includes providing the outgoing light at one or more selected wavelength channels to a beam director that directs received light based on wavelength.

19. The method of any one of claim 15, further comprising:
   detecting further incoming light, the further incoming light imparted with incoming communication information comprising spatial profiling information of an additional environment; and
   processing the distance information and the spatial profiling information to determine an estimation of a spatial profile of the environment and the additional environment.

20. The system of claim 1, wherein the system is configured to provide the outgoing light at one or more selected wavelength channels, and the one or more directions correspond to the one or more selected wavelength channels.

* * * * *